C. ROBINSON.
Scaffold.
No. 71,791. Patented Dec. 3, 1867.
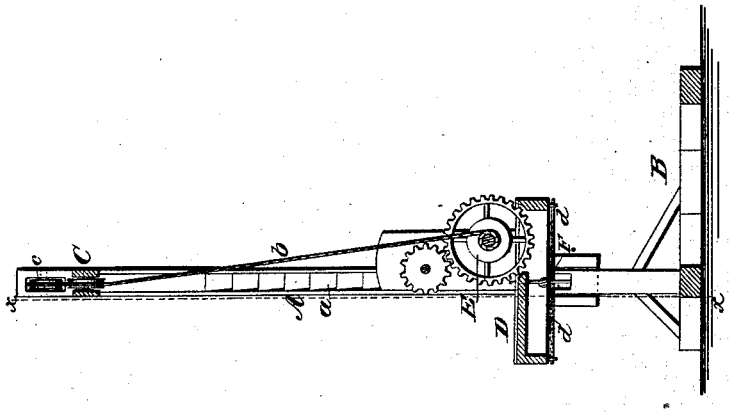
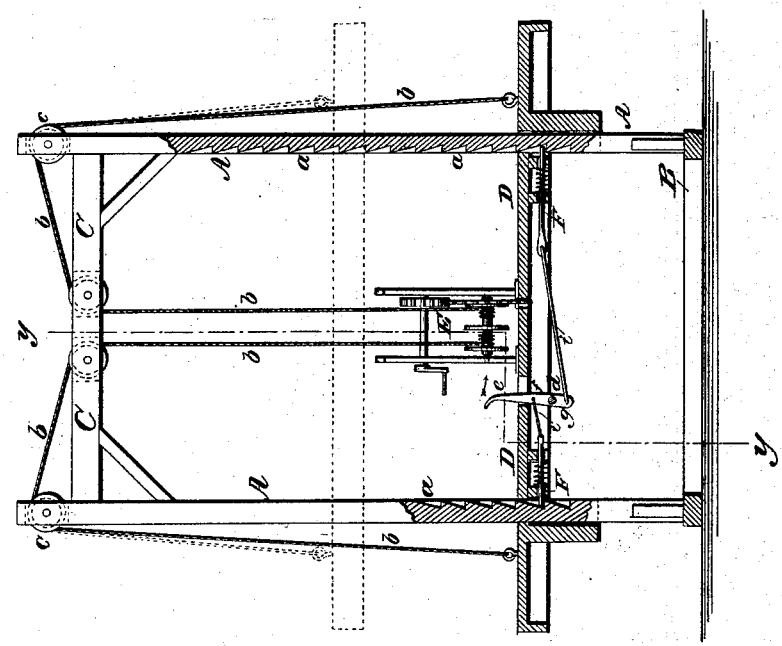
Witnesses
Theo Insche
Wm Trewrn
Inventor:
Clark Robinson.
Per [illegible]
Attorneys

United States Patent Office.

CLARK ROBINSON, OF ROCHESTER, MINNESOTA.

Letters Patent No. 71,791, dated December 3, 1867.

IMPROVEMENT IN SCAFFOLD.

*The Schedule referred to in these Letters Patent and making part of the same.*

TO ALL WHOM IT MAY CONCERN:

Be it known that I, CLARK ROBINSON, of Rochester, in the county of Olmstead, and State of Minnesota, have invented a new and improved Scaffold; and I do hereby declare that the following is a full, clear, and exact description thereof, which will enable those skilled in the art to make and use the same, reference being had to the accompanying drawings, forming part of this specification, in which—

Figure 1 is a longitudinal vertical section of my improved scaffold, taken on the line $x\,x$, fig. 2.

Figure 2 is a vertical cross-section of the same, taken on the line $y\,y$, fig. 1.

Similar letters of reference indicate corresponding parts.

This invention relates to a portable scaffold, which is to be used by painters, carpenters, and masons, and which can be raised or lowered at will to any desired height by the parties standing upon the platform of the scaffold.

The invention consists in the use of two uprights, which are secured to a horizontal frame, and the inner sides of which are provided with ratchets, into which spring-bolts secured to the platform fit. The said bolts can be easily operated or thrown out of gear by those on the platform, for the purpose of lowering, while the hoisting is done by means of ropes passing over pulleys on the top of the uprights, and wound upon a windlass, which is arranged on top of the platform.

A A are two uprights, made of wood or other suitable material, and of the necessary height. They are at their lower ends firmly secured in a wooden frame, B, which is anchored in the ground, or otherwise fastened to the same when the scaffold is to be used. At their upper ends the uprights are connected by a cross-bar, C. To the inner sides of the uprights are secured ratchet-bars, or the uprights are provided with notches, $a\,a$, as shown in fig. 1. D is the platform, which is arranged around the uprights, so as to slide up and down on them. A windlass, E, is secured to the platform, and operated by a crank and gear-wheels in the usual manner. The inner ends of two ropes, $b\,b$, are secured to the windlass, pass up over pulleys $c\,c$ on top of the uprights A, and then down again, their outer ends being secured to the platform again, so that by winding their inner ends around the windlass the platform will be raised. Two spring-bolts F F are arranged on the under side of the platform, and are forced by spiral or other springs into the notches $a\,a$, so as to prevent the platform from falling. These bolts connect by links $i\,i$ with cranks $f$ and $g$ of a rock-shaft, $d$, arranged across the platform to the under side of the same. To the rock-shaft is secured an arm or lever, $e$, which passes up to the upper side of the platform. By moving the same in the direction of the arrow, shown in fig. 1, the bolts will be withdrawn from the ratchet, and the platform can be made to descend by slowly unwinding the rope $b$ from the windlass.

Claim.

I claim as new, and desire to secure by Letters Patent—

1. The uprights A, when provided with notches $a\,a$, in combination with the spring-bolts F, and lever $e$, for the purpose of supporting the platform, and for lowering the same when required.

2. The windlass E, in combination with the frame A, platform D, and spring-bolts F, all made and operating substantially as and for the purpose herein shown and described.

CLARK ROBINSON.

Witnesses:
JAMES B. OTT,
W. W. MAYO.